March 11, 1969  DE LACY F. FERRIS  3,431,731
POPPET VALVE DEVICE

Filed Sept. 27, 1967  Sheet 1 of 2

DeLacy F. Ferris,
INVENTOR.

BY Harry M. Saragovitz
Edward J. Kelly
Herbert Berl
J. Keith Fowler

United States Patent Office 3,431,731
Patented Mar. 11, 1969

3,431,731
POPPET VALVE DEVICE
DeLacy F. Ferris, Van Nuys, Calif., assignor, by mesne assignments, to the United States of America as represented by the Secretary of the Army
Filed Sept. 27, 1967, Ser. No. 671,166
U.S. Cl. 60—225
Int. Cl. F02k 9/06, 3/00; F16k 13/04
7 Claims

ABSTRACT OF THE DISCLOSURE

A spring-loaded poppet valve formed in its seating portion with a central opening closed by a rupturable diaphragm secured thereto. The poppet valve is responsive to fluid pressure conditions in the manifold for moving the same to an open position. A diaphragm punch disposed in coaxial alignment with the rupturable diaphragm is actuated by squib means to rupture the diaphragm thereby establishing a balanced condition and allowing the spring to move the poppet to a closed position. Damping is provided by an annular damping cavity and by restrictive flow through the diaphragm passage.

Background of the invention

In a rocket power plant having both boost and sustain thrust chambers with both chambers operating initially from the same manifold system, it is necessary to provide a booster cutoff valve for terminating operation of the booster motor. Prior art valves used in this type fueling system have many disadvantages, e.g., excessive surge as well as mechanical shock due to metal striking metal or resulting from powder charges. These pressure surges and shocks are undesirable because of their effects on the effective power plant loads and their effects on the sensitive missile components such as the guidance. Therefore, a need exists for a valve of this nature which is positively acting yet smooth in operation, simple in construction, and economical to manufacture.

Summary of the invention

The poppet valve according to the present invention provides smooth shut down of the booster wherein surges and shocks are minimized thereby overcoming disadvantages of prior art valves. In operation, a valve constructed according to this invention will reduce loads on the power plant structure and shocks on the missile components. The improved poppet valve is spring-loaded and acts initially as a direct response valve wherein the valve is responsive to fluid pressure from the fuel manifold. To terminate the booster operation, a frangible diaphragm carried by the seating portion of the poppet valve, is ruptured by an explosively actuated punch whereby the spring is allowed to move the poppet to a closed position. Movement of the poppet is damped by an annular damping cavity provided within the valve housing and by the ruptured diaphragm.

Description of the preferred embodiment

Figure 1:
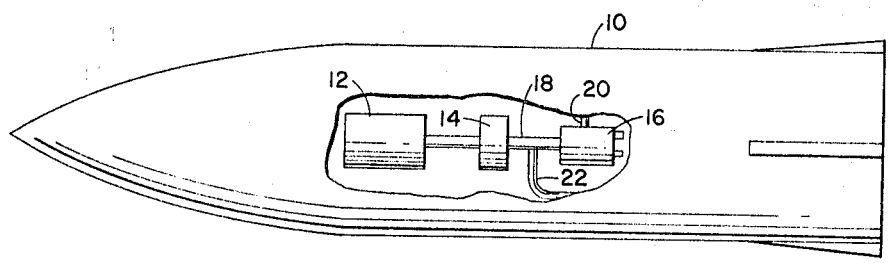
FIGURE 1 depicts a missile having a portion thereof cutaway to illustrate the fueling system and, more particularly, the disposition of the poppet valve within the fueling system.

Referring to the drawing, FIGURE 1, reference 10 designates a missile which has been cutaway to show schematically the major portion of the power plant fueling system; namely, fuel tank 12, fuel manifold 14, and poppet control valve 16. The forward end of the poppet valve is connected with the fuel manifold by conduit 18. Conduit 20 (only partially shown) extends transversely from one side of the valve body and provides fluid communication with the booster motor chamber (not shown) while conduit 22 provides fluid communication with the sustainer motor thrust chamber (not shown).

Figure 2:
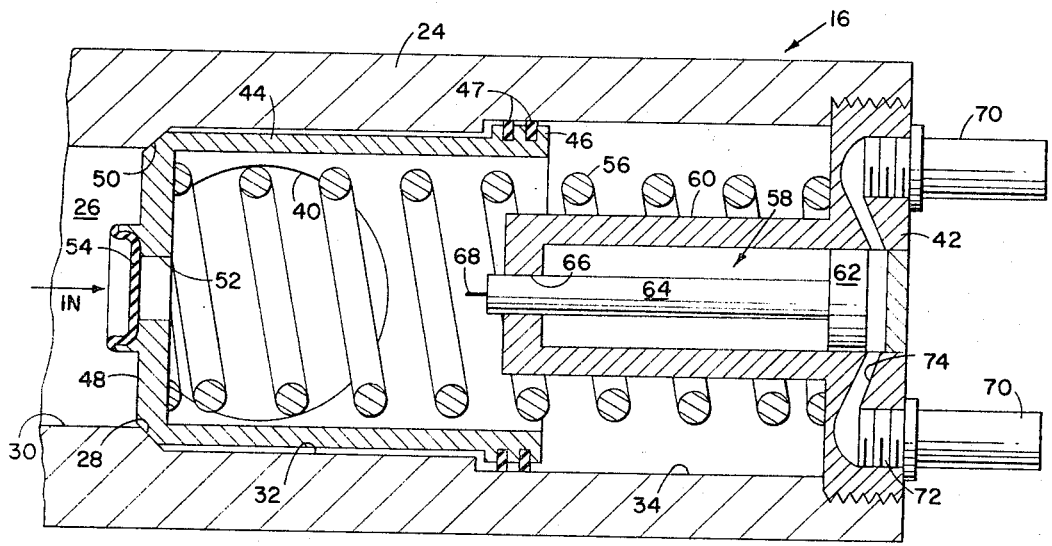
FIGURE 2 is a vertical cross-section of the poppet valve according to the invention, this view illustrating the poppet valve element in seated position, closing off the outlet passage to the booster.

Referring now to FIGURE 2, valve 16 includes an elongated, cylindrical valve housing or body 24 having an open forward end defining an inlet passage 26 for fluid communication with manifold-connecting conduit 18. An annular valve seat 28 is formed within the bore 30 of the cylindrical valve body about the mouth of inlet passage 26. As will be explained more fully hereinafter, bore 30 is formed in a stepped manner, i.e., the same is formed with a first portion or chamber 32 having a first internal diameter and second portion or chamber 34 having a larger internal diameter. An outlet passage or port 40 formed transversely through the cylindrical wall of valve body 24 and opening into bore portion 32 provides fluid communication with the booster chamber (not shown) via conduit 20. The opposite end of bore 30 is closed as by a circular end plug 42 threadedly received therein. Cylindrical valve element or member 44 has an annular flange or shoulder 46 formed on its rearward end, this shoulder having piston rings 47 for sliding engagement with the second or larger bore portion 34. Valve member 44 has a closed forward end 48 formed with an annular valve seating portion 50 for mating engagement with seat 28, the forward end being further formed with a central aperture 52. This aperture is normally closed by a frangible diaphragm 54 rigidly secured on the forward face of end wall 48. A coiled, compression spring 56 coaxially disposed within bore 30 normally urges the poppet valve element into seated engagement with seat 28 thereby closing off fluid communication to outlet port 40 and the booster chamber (not shown).

To provide means for rupturing the frangible diaphragm, a diaphragm punch 58 is coaxially disposed within a cylinder 60 which is formed integrally with end plug 42. Punch 58 is defined by a piston 62 slidably engaged within cylinder 60 and a piston rod 64 slidably engaged within a bore 66 in the forward end of cylinder 60. A sharp, disc-like cutting element 68 is rigidly secured on the forward end of the piston rod. It should be apparent that the cutting element could have different forms and shapes from that shown as will be explained hereinafter.

To actuate the punch, i.e., to drive the same forward, a plurality of explosive squibs 70 are provided. These squibs are secured within the end plug as by threads 72. Communication between the squibs and the rearward face of piston 62 is provided by generally radial passageways 74 formed in the end plug.

Operation

Figure 3:
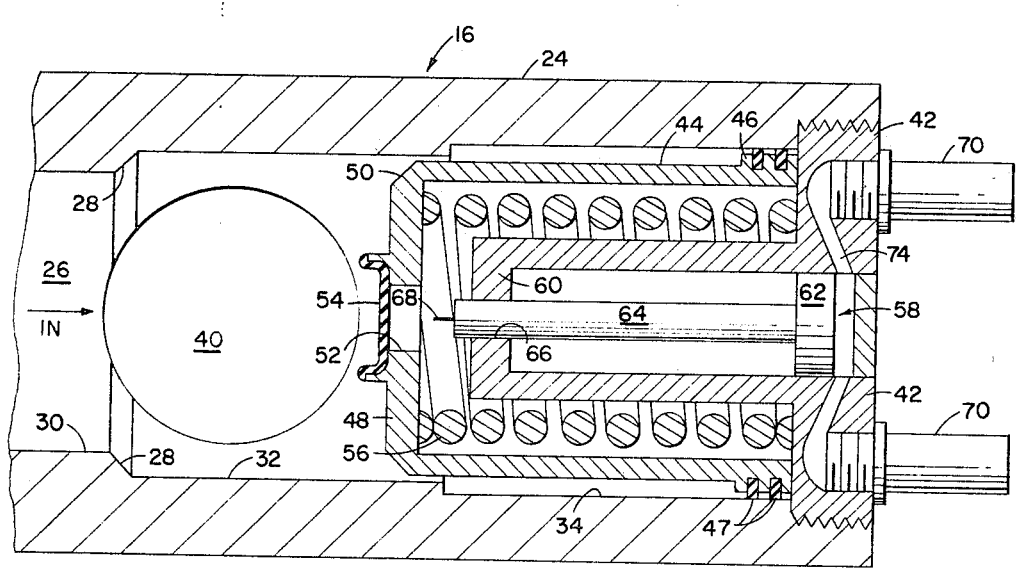
FIGURE 3 is a view similar to that of FIGURE 2, but showing the poppet element in the open position.

Initially, the poppet valve member 44 is urged forward by the spring into its seated position as depicted in FIGURE 2. In this position the valve member functions as a direct response valve wherein the same is directly responsive to fluid pressure from the manifold to cause movement against the action of the spring. On command, when it is desired that the rocket power plant (not shown) be started, fuel from the manifold is supplied to the inlet passage thereby causing the valve element to move away from its closed or seated position to an open position as illustrated in FIGURE 3 thereby allowing fuel to be supplied to the booster chamber (not shown) via booster outlet port 40. When it is desired to terminate the booster chamber operation, the squibs are fired thereby driving the cutting means of the diaphragm punch forward through the frangible diaphragm, which is supported against pressure loads from the manifold but unsupported against loads from the diaphragm punch. When the diaphragm is ruptured, the valve member becomes pressure-balanced by virtue of propellant flow through the diaphragm opening into the spring cavity. With this pressure-balanced condition established, the spring forces the poppet member to the closed position (FIGURE 2). Damping is provided for the moving valve member by the annular damping cavity. Additionally, the diaphragm passage can be sized to provide damping in the early part of the stroke. Accordingly, it is seen that the balanced valve and spring arrangement results in a reduction in the size of the powder charge required in the squib compared to that required to close an unbalanced valve. All of these factors reduce loads and shocks. Proper design of the spring and damping means minimizes pressure surges. Thus, a valve is provided which is positive in action yet smooth in operation in performing its function of controlling fuel flow to the booster.

While the poppet valve according to this invention has been described as an element of a rocket fueling system, the same has utility in numerous other combinations and applications wherein a line condition responsive valve having a selectively controlled cut-off is desired.

I claim:
1. A line-condition responsive poppet valve device comprising: a valve body formed with an axial bore, said bore having an open, forward end defining an inlet port in fluid communication with a fluid manifold and having its opposite end closed by an end plug, said body having an annular valve seat formed in said bore about the mouth of said inlet port, said body further having an outlet port formed in the wall of said bore transversely thereof, said outlet port being located inwardly of said valve seat; a cylindrical poppet valve member slidably received within said bore, said cylindrical member having an end wall, said end wall being formed with an annular seating portion for engagement with said valve seat, said end wall further having a central aperture formed therein; a frangible diaphragm secured on the end wall and closing said central aperture; spring means disposed within said bore for urging said poppet member into seated engagement with said valve seat; said poppet member being responsive to fluid pressure from the fluid manifold for moving the same against the spring bias from a closed position to an open position allowing uninterrupted flow of fluid to said outlet port; and means carried by said end plug for rupturing said frangible diaphragm, whereby said poppet member is allowed to move from its open position by said spring means to a pressure-balanced condition wherein the poppet element is seated thereby closing said outlet port from communication with the fluid manifold.

2. A poppet valve device as defined in claim 1 wherein said valve device is an element of the fueling system for a rocket power plant having both boost and sustain thrust chambers, said fluid manifold is supplied with liquid fuels from propellant tanks, said inlet port is in communication with said manifold, and said outlet port provides communication with said booster thrust chamber.

3. A poppet valve device as defined in claim 1 wherein said bore has a first portion adjacent said inlet port formed of a first diameter and has a second portion formed of a second diameter, said second diameter being larger than said first diameter, and wherein said cylindrical poppet member has an outside diameter smaller than said first diameter, said poppet member further having an annular piston flange formed on the end thereof opposite its end wall, said piston flange having an outside diameter larger than said first diameter and substantially equal to said second diameter, piston rings carried within the periphery of said flange for slidably engaging the second portion of said bore, the arrangement wherein an annular damping cavity is provided in the space intermediate the outer periphery of said cylindrical poppet member and said second bore portion whereby pressure surges are minimized during movement of said valve element in a closing direction.

4. A poppet valve device as defined in claim 1 wherein said rupturing means is defined by an axially movable punch mounted in said end plug in coaxial alignment with said frangible diaphragm and wherein actuating means are provided in said end plug for driving said punch into engagement with said frangible diaphragm.

5. A poppet valve device as defined in claim 4 wherein said actuating means includes a plurality of explosive squibs carried by said end plug and operably positioned so as to drive the punch axially.

6. A poppet valve device as defined in claim 5 wherein said end plug is formed with an elongated cylinder coaxially disposed within said body bore and formed of a smaller diameter than that of said cylindrical poppet member so as to be telescopingly received within said member when the valve is in its open position, and wherein said punch is defined by a piston slidably mounted in said elongated cylinder and a piston rod extending slidably through the forward end of said elongated cylinder, said rod having diaphragm rupturing means on its forward end.

7. A poppet valve device as defined in claim 6 wherein said valve device forms a control element of the fueling system for a rocket power plant having both boost and sustain thrust chambers, said fluid manifold is supplied with liquid fuels from propellant tanks, said inlet port is in fluid communication with said manifold, and said outlet port provides fluid communication with said booster thrust chamber.

References Cited

UNITED STATES PATENTS

| | | | |
|---|---|---|---|
| 2,919,543 | 1/1960 | Sherman | 137—71 |
| 2,972,998 | 2/1961 | Detwiler | 137—68 |
| 3,008,479 | 11/1961 | Mancusi | 137—68 |
| 3,117,417 | 1/1964 | Rutkowski | 60—240 |

CARLTON R. CROYLE, *Primary Examiner.*

DOUGLAS HART, *Assistant Examiner.*

U.S. Cl. X.R.

60—240; 137—71